Figure 1:
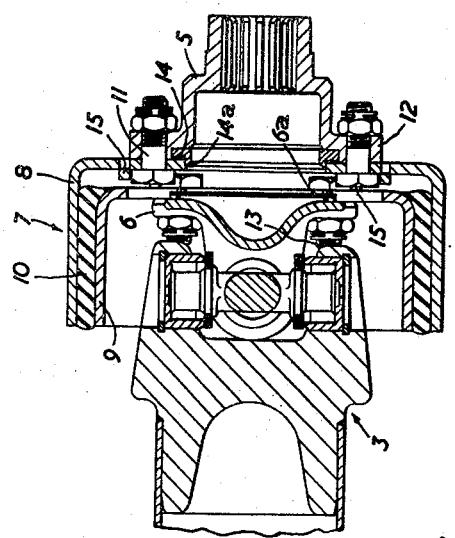
Figure 1:
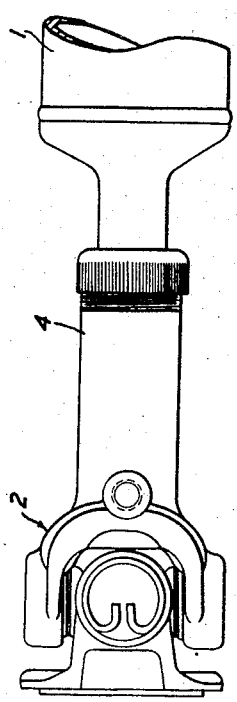

Aug. 16, 1960

T. R. CHARLESWORTH 2,949,021

UNIVERSAL JOINTS

Filed Aug. 22, 1958

2 Sheets-Sheet 1

INVENTOR
THOMAS RICHARD CHARLESWORTH
BY
Irwin S. Thompson
ATTORNEY

Aug. 16, 1960        T. R. CHARLESWORTH        2,949,021
                        UNIVERSAL JOINTS

Filed Aug. 22, 1958                          2 Sheets-Sheet 2

INVENTOR
THOMAS RICHARD CHARLESWORTH
BY
Irwin S. Thompson
ATTORNEY

United States Patent Office 2,949,021
Patented Aug. 16, 1960

2,949,021

UNIVERSAL JOINTS

Thomas Richard Charlesworth, Sheffield, England, assignor to Laycock Engineering Limited, Sheffield, England Filed Aug. 22, 1958, Ser. No. 756,643

Claims priority, application Great Britain Sept. 4, 1957

14 Claims. (Cl. 64—11)

This invention relates to power transmission shafts embodying universal joints, more especially the driving or propeller shafts used on motor vehicles and comprising two or more universal joints, the latter being of the constant or non-constant velocity type depending on the length of the shaft and the degree of angularity which the joints have to accommodate.

Taking the case of a motor vehicle propeller shaft of the kind disposed longitudinally of the vehicle, with the universal joints fastened to both ends of the tubular shaft, as for example by welding, a noise path is set up from the engine and transmission unit to the output end of the final drive. Moreover the absence of non-metallic components along this path limits the degree of resilience or torsional flexibility that can be provided. With the aim of introducing torsional flexibility and a degree of noise insulation into the system the tubular propeller shaft has sometimes been replaced by two coaxial tubes one of which is fixed to the output end of the driving universal joint and the other to the input end of the driven universal joint. The two coaxial tubes have a ring or rings of compressed rubber arranged between them, which may or may not be bonded to one or other of the two tubes, in order to provide a driving connection between the tubes.

However, the torsional flexibility provided by the rubber, in any such arrangement as that referred to above, enables the phase relationship between the two universal joints to vary which may be a serious disadvantage when non-constant velocity, or Hooke's type, universal joints are used. Further, the connection of the two coaxial shafts by the rubber interposed therebetween results in a considerable increase in mass towards the centre of the propeller shaft, which may result in an increase in the degree of unbalance and a possible reduction in the critical speed of the shaft.

The main object of the present invention is to afford a degree of torsional flexibility in power transmission systems having drive shafts embodying universal joints, together with damping and sound insulating qualities, by the provision of improved means avoiding a continuous metallic noise path through the drive shaft. Another object is to achieve the foregoing result without introducing the possibility of a change in the phase relationship between the driving and driven universal joints when torque is applied, other than the degree of wind-up inherent in the drive shaft connecting the two universal joints.

Further objects are to provide such improved means for introducing torsional flexibility and damping and sound insulating qualities in a form which can be fitted to existing transmission systems with little or no modification to the existing universal joints, and which will enable wide joint angles to be used without overstressing the resilient material employed to provide flexibility and damping whilst providing high radial stability to avoid relative lateral movement of the axes of coupled shafts of the systems under stresses imposed by universal joint action.

The invention comprises, in or for a power transmission shaft, the combination of a universal joint and flexible coupling or damping means embodying an annular cushion of resilient material disposed coaxially with the input or output axis of said universal joint and adapted for coupling the transmission shaft to a driving or driven member of a transmission system in which the shaft is used. Preferably said annular cushion of resilient material is of the same order of axial length as the universal joint and is disposed in lapping relation to the latter.

The coupling and damping means preferably comprise two members between which the annular cushion of resilient material provides a driving connection, one of said members being fixed to the universal joint and the other being adapted for fixing to said driving or driven member.

The invention also comprises a power transmission shaft having a universal joint at each end and flexible coupling or damping means embodying an annular cushion of resilient material disposed coaxially with the shaft and introduced adjacent one of said universal joints and at the opposite side of said universal joint (in the transmission sense) from the other universal joint.

Figure 4:
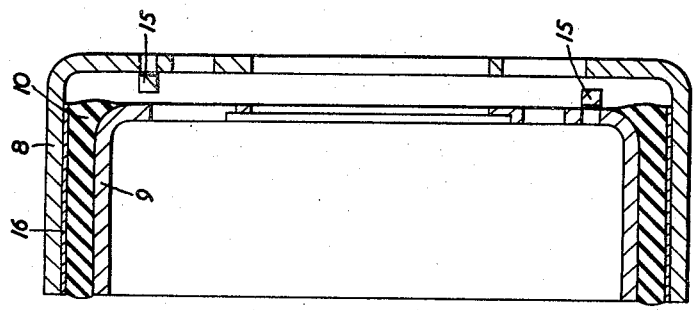
Figure 3:
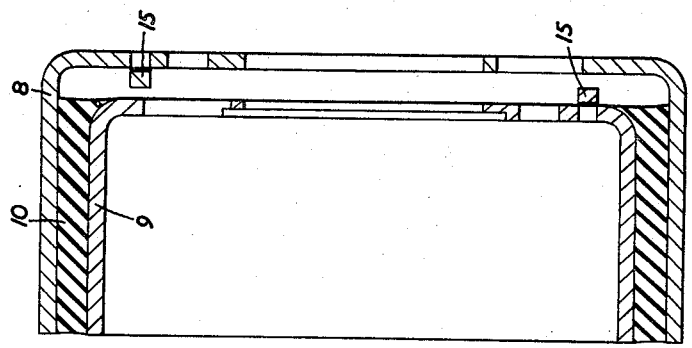
Figure 2:
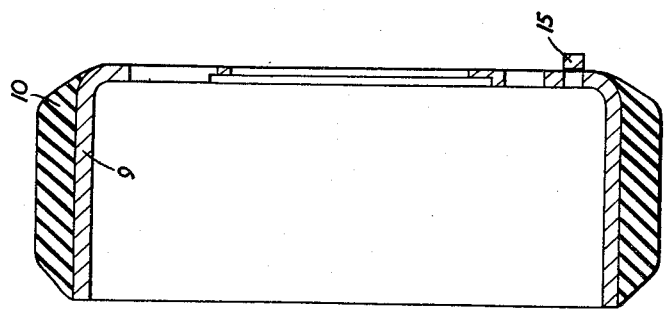

The invention will now be further described, by way of example, with reference to the accompanying drawings, in which:

Figure 1 is a part-sectional view of one embodiment of the invention as carried into effect in connection with a typical transmission system for a motor vehicle, Figure 2 is a detail cross-sectional view of a sub-assembly of the embodiment of Figure 1, and Figures 3 and 4 are axial sectional views of flexible damping means of alternative embodiments of the invention.

In the arrangement of Figure 1 a tubular propeller shaft 1 has fitted to each end, as usual, a universal joint 2, 3 of the Hooke's type. At the forward, or driven, end of the shaft 1 a conventional form of sliding spline coupling 4 is disposed between the shaft 1 and the universal joint 2. The universal joint 3 is welded to the opposite or driving end of the shaft 1. Interposed between a driven member 5 of the transmission system and the output end of the propeller shaft 1, i.e. the flange 6 of the output yoke of the driven universal joint 3, is a flexible coupling 7 forming flexible coupling or damping means. This coupling comprises a cup-shaped member 8, for example in the form of a steel pressing, which is fixed to the aforesaid driven member 5 of the transmission system. A similar cup-shaped member 9, dimensionally smaller than the one already mentioned, is attached to the flange 6 of the output yoke of the driven universal joint 3 so that it lies coaxially within the larger cup-shaped member 8, with the closed ends of the members 8, 9 spaced apart approximately the same distance as the width of the annular space between their cylindrical side walls which terminate flush with each other at the open ends of the members. Such open ends are directed forwardly, i.e. so that the smaller cup-shaped member 9 surrounds the driven universal joint 3 of the propeller shaft 1.

Between the two cup-shaped members 8, 9 is a coupling member 10 in the form of a cushion of resilient material, such as rubber, which is fixedly attached to the smaller cup-shaped member 9, as for example by bonding. This annular resilient cushion 10 terminates substantially at the closed end of the smaller cup-shaped member 9, being pre-compressed before insertion between the cylindrical walls of the two cup-shaped members 8, 9 and provides a flexible drive from the driven universal joint 3 of the propeller shaft 1 to the driven member 5 of the transmission system.

Preferably the outer cup-shaped member 8 is secured to the driven member 5 of the transmission system by a ring of bolts such as 11 which pass through holes in an outwardly turned flange 12 of the driven member 5 and through a ring of aligned holes in the closed end of the cup-shaped member 8. A similar ring of bolts such as 13 connects the closed end of the smaller cup-shaped member 9 to the flange 6 on the output yoke of the universal joint 3. The closed end of the cup-shaped member 9 is provided with a central opening which seats against a portion 6a of the flange 6 of the output yoke of the universal joint 3. Likewise the cup-shaped member 8 has a central opening which seats against a shoulder 14a of a centering ring 14 which itself seats in a central annular groove formed in the inner periphery of the flange 12. This arrangement ensures accurate radial location of both the cup-shaped members.

Both the cup-shaped members are formed with upstanding tongues such as 15 which prevent rotation of the bolts 11, 13 which are provided with self-locking nuts. The two rings of bolts 12, 13 are angularly staggered and arranged so that, in the event of the coupling member 10 shearing the respective bolt heads will engage and provide a temporary driving connection between the flange 6 and the driven member 5.

Figure 2 is a cross-sectional view of the inner or smaller cup-shaped member 9 and bonded coupling member 10 before assembly with the outer or larger cup-shaped member 8, from which it will be seen that the body of rubber in such section is originally roughly trapezoidal in shape. During assembly, the bonded members 9 and 10 are inserted into the other member 8 through a tapered die, the member 10 being considerably compressed in the process.

In the embodiment to which Figure 3 relates the cushion of resilient material forming the coupling member 10 of the flexible coupling or damping means is injection moulded, being injected between the members whilst they are held in the desired final relationship. The material of the member 10 is then bonded to the cup-shaped members 8, 9 and hence remains substantially uncompressed in the final assembly.

Figure 4 is a similar view to Figure 3 and relates to a further embodiment in which the coupling member 10 is once again compressed in the final assembly. Initially a ring of resilient material such as rubber, forming the coupling member 10, is compressed between the outer periphery of the cup-shaped member 9 and the inner surface of a thin cylindrical shell member 16 and is then bonded to both these members. The shell member 16 is, after bonding, forced into the larger cup-shaped member 8 within which it is an interference fit.

Although in the embodiment illustrated in Figure 1 the resilient coupling member 10 is disposed at the rear or driving end of the propeller shaft, where it is disposed to break the noise path from the rear driven wheels of the vehicle, it can if desired be disposed at other points of the transmission system, for example at the front or driven end of the propeller shaft. In a transmission system utilising a two-piece propeller shaft the coupling member 10 can, if required, be disposed at the midship position between the two transmission shafts forming the complete propeller shaft.

It will be seen that the invention provides simple and effective means for introducing torsional flexibility and noise insulation into the power transmission system without interfering in any way with the normal operation of the mechanical universal joints.

I claim:

1. In or for a power transmission shaft, the combination of a universal joint and flexible coupling and damping means embodying an annular cushion of resilient material disposed coaxially with the axis of said universal joint and bolted to the latter on the side thereof remote from the transmission shaft, said means being adapted for coupling the transmission shaft in a transmission system and said annular cushion arranged in lapping relation to the joint with a length in the axial direction of the joint several times greater than its thickness in the radial direction of the joint.

2. In or for a power transmission shaft, the combination of a universal joint and flexible coupling and damping means embodying inner and outer coupling members and a resilient annular cushion disposed between said members in driving engagement with radially inner and outer peripheral surfaces thereof respectively, said members surrounding the universal joint and one of said members being adapted for coupling the transmission shaft in a transmission system.

3. The combination of a universal joint and flexible coupling and damping means comprising two cup-shaped members disposed coaxially one within the other with their end walls adjacent and an annular cushion of resilient material disposed between said members to provide a driving connection between the sides walls thereof, one of said end walls being fixed to the universal joint and the other adapted for coupling the joint in a transmission system.

4. The combination of a universal joint and flexible coupling and damping means comprising two cup-shaped members disposed one within the other, the inner of said members surrounding the universal joint with its end wall bolted to the latter and the outer having its end wall adapted for bolting the joint in a transmission system, and an annular cushion of resilient material disposed between said members and providing a driving connection between the side walls of said members.

5. The combination according to claim 4, wherein said annular cushion is bonded to the inner of said members and, when the members are in their final positional relationship, is considerably compressed.

6. The combination of a universal joint and flexible coupling and damping means comprising two cup-shaped members disposed one within the other and arranged coaxially with respect to one axis of the joint, said members both having cylindrical side walls, and an annular cushion of resilient material compressed between said side walls and bonded to the inner of said members, said annular cushion being roughly trapezoidal in cross-section in its free form and said inner member being fixed to the universal joint with its side wall surrounding the latter whilst said outer member is adapted for coupling the joint in a transmission system.

7. The combination of a universal joint and flexible coupling and damping means comprising two cup-shaped members disposed one within the other and arranged coaxially with respect to one axis of the joint, said members both having cylindrical side walls, and an annular cushion of resilient material compressed between said side walls and bonded to the inner of said members whilst in frictional engagement with the side wall of the outer of said members, said annular cushion being roughly trapezoidal in cross-section in its free form, said inner member being fixed to the universal joint with its side wall surrounding the latter and said outer member being adapted for coupling the joint in a transmission system.

8. The combination of a universal joint and flexible coupling and damping means comprising two cup-shaped members disposed one within the other and arranged coaxially with respect to one axis of the joint and surrounding the latter, said members both having cylindrical side walls, a cylindrical shell member arranged as an interference fit within the outer of said cup-shaped members, and an annular cushion of resilient material bonded to the outer surface of the inner of said cup-shaped members and compressed between the latter and said shell member, said inner member being fixed to the universal joint and said outer member being adapted for coupling the joint in a transmission system.

9. The combination according to claim 8, wherein said annular cushion is also bonded to said shell member.

10. The combination of a universal joint and flexible coupling and damping means comprising two cup-shaped members disposed one within the other, the inner of said members being fixed to and surrounding the universal joint and the outer being adapted for coupling the joint in a transmission system, and an annular cushion of resilient material injection moulded between said members and providing a driving connection between the side walls of said members.

11. The combination according to claim 3, wherein said side walls surround said joint which is fixed to the end wall of the inner of said members.

12. In or for a power transmission shaft, flexible coupling and damping means comprising two cup-shaped members disposed coaxially one within the other, and an annular cushion of resilient material with an axial length greater than its radial thickness in driving connection with the outer walls of said members, the end walls of said members being arranged adjacent one another and having axially directed bolt holes for bolting respectively to a universal joint of said shaft and to an element of a transmission system to which said shaft is to be coupled.

13. Means according to claim 12, wherein said bolt holes are arranged in two circular series in said end walls respectively, corresponding holes of the two series being angularly staggered whereby in the event of failing of said cushion in service a drive is provided by engagement of the heads of the bolts in said holes.

14. Means according to claim 13, wherein each of said end walls has a series of apertures aligned with the bolt holes in the other end wall and through which said bolts are fitted in position.

References Cited in the file of this patent

UNITED STATES PATENTS

| | | |
|---|---|---|
| 874,926 | Behr | Dec. 31, 1907 |
| 2,067,284 | Pearce | Jan. 12, 1937 |
| 2,174,223 | Frauenthal et al. | Sept. 26, 1939 |
| 2,691,283 | Stover | Oct. 12, 1954 |

FOREIGN PATENTS

| | | |
|---|---|---|
| 672,591 | Germany | Mar. 6, 1939 |